US012780566B2

(12) United States Patent
Chun

(10) Patent No.: US 12,780,566 B2
(45) Date of Patent: Nov. 3, 2026

(54) VACUUM-ASSISTED PRODUCT HANDLING EQUIPMENT

(71) Applicant: Leprino Foods Company, Denver, CO (US)

(72) Inventor: Joshua Chun, Denver, CO (US)

(73) Assignee: Leprino Foods Company, Denver, CO (US)

( * ) Notice: Subject to any disclaimer, the term of this patent is extended or adjusted under 35 U.S.C. 154(b) by 439 days.

(21) Appl. No.: 17/836,630

(22) Filed: Jun. 9, 2022

(65) Prior Publication Data

US 2023/0002173 A1 Jan. 5, 2023

Related U.S. Application Data

(60) Provisional application No. 63/217,883, filed on Jul. 2, 2021.

(51) Int. Cl.
*B65G 47/91* (2006.01)
*B25J 15/06* (2006.01)

(52) U.S. Cl.
CPC .......... *B65G 47/91* (2013.01); *B25J 15/0616* (2013.01); *B65G 2201/0202* (2013.01)

(58) Field of Classification Search
CPC ......... B65B 35/18; B65B 41/06; B65B 5/105; B65B 5/08; B65B 25/068; B25J 15/0052;
(Continued)

(56) References Cited

U.S. PATENT DOCUMENTS 5,636,887 A * 6/1997 Petropoulos ........... B65G 47/91 285/305
2004/0139989 A1* 7/2004 Llich .................... B65G 47/911 134/22.11
(Continued)

FOREIGN PATENT DOCUMENTS

CN 108438319 A * 8/2018 ............. B65B 35/18
DE 19859595 A1 * 7/2000 ........... B65G 47/682
(Continued)

OTHER PUBLICATIONS

Translation of WO 2019/159793 (Year: 2019).*
(Continued)

*Primary Examiner* — Thomas M Wittenschlaeger
(74) *Attorney, Agent, or Firm* — Kilpatrick Townsend & Stockton LLP

(57) ABSTRACT

A vacuum-assisted product-handling system is described that includes a carrier to move an unpackaged product into a contact position. The system also includes an actuation unit to move the unpackaged product from the contact position of the carrier to a receiving container. The actuation unit may include a mechanical arm to lift the unpackaged product from the carrier and deposit the unpackaged product in the receiving container, and a vacuum tool connected to an end of the mechanical arm. The vacuum tool may be operable to hold the unpackaged product as the unpackaged product is moved by the actuation unit from the carrier to the receiving container. The vacuum tool may include one or more arrays of suction devices, where each array of suction devices is connected to a single vacuum source.

17 Claims, 6 Drawing Sheets

300

(58) Field of Classification Search
CPC ... B25J 15/0658; B25J 15/0616; B65G 47/91; B65G 2201/0202
See application file for complete search history.

(56) References Cited

U.S. PATENT DOCUMENTS

| | | | | |
|---|---|---|---|---|
| 2015/0308466 | A1* | 10/2015 | Girtman | B25J 15/0052 92/163 |
| 2021/0402618 | A1* | 12/2021 | Wagner | B25J 15/0616 |
| 2022/0279763 | A1* | 9/2022 | Correa | A01K 43/00 |

FOREIGN PATENT DOCUMENTS

| | | | | |
|---|---|---|---|---|
| FR | 2800721 A1 * | 5/2001 | | B65G 47/917 |
| NL | 9201150 A * | 1/1994 | | B65B 5/105 |
| WO | WO-2019159793 A1 * | 8/2019 | | B65B 23/08 |

OTHER PUBLICATIONS

Translation of CN 108438319 A (Year: 2018).*
Translation of FR 2800721 A1 (Year: 2001).*
Translation of NL 9201150 A (Year: 1994).*
Translation of DE 19859595 A1 (Year: 2000).*

* cited by examiner

200

300

VACUUM-ASSISTED PRODUCT HANDLING EQUIPMENT

CROSS-REFERENCES TO RELATED APPLICATIONS

This application is a nonprovisional of, and claims benefit of priority to U.S. Provisional Patent Application No. 63/217,883, filed Jul. 2, 2021, the entire contents of which is incorporated herein by reference for all purposes.

TECHNICAL FIELD

The present technology relates to vacuum-assisted product handling equipment and methods of operating the equipment. More specifically, the present technology relates to vacuum-assisted equipment for handling food products.

BACKGROUND

Product manufacturing is increasingly automated to increase productivity. Among other aspects of this automation, there is continued development of equipment to move unpackaged products from a production line to packaging material without the aid of a person. The challenges in developing this automation equipment include picking up and moving unpackaged products that are heavy, irregularly shaped, delicate, and/or non-rigid, among other characteristics that make the products difficult to carry between locations.

Thus, there is a need for improved automated systems and methods to move products from a production area to a packaging area where the products are placed in packaging materials. These and other needs are addressed by the present technology.

SUMMARY

The present technology includes vacuum-assisted product-handling systems. The systems may include a carrier to move an unpackaged product into a contact position. The systems may further include an actuation unit to move the unpackaged product from the contact position of the carrier to a receiving container. The actuation unit may include a mechanical arm to lift the unpackaged product from the carrier and deposit the product in the receiving container. The actuation unit may also include a vacuum tool connected to an end of the mechanical arm. The vacuum tool may be operable to hold the unpackaged product as the unpackaged product is moved by the actuation unit from the carrier to the receiving container. The vacuum tool may include one or more arrays of suction devices, where each array of suction devices is connected to a single vacuum source. The vacuum tool is operable to vacuum attach to the unpackaged product on the carrier and detach from the unpackaged product when deposited in the receiving container.

In additional embodiments, the vacuum-assisted product-handling systems may include a compressed gas reservoir to supply gas to the suction devices of the vacuum tool when the vacuum tool detaches from the unpackaged product. In further embodiments, at least one of the suction devices of the vacuum tool is unattached to the unpackaged product as the actuation unit moves the unpackaged product from the carrier to the receiving container. In still further embodiments, the single vacuum source may include a vacuum pump operable to maintain a vacuum in the suction devices attached to the unpackaged product. In yet additional embodiments, the systems may further include an array of sheet holding suction devices extending from the vacuum tool. The sheet holding suction devices may be operable to place a sheet of packaging material between layers of the unpackaged product in the receiving container. In more embodiments, the array of suction devices may include greater than or about 25 suction devices. In yet more embodiments, the carrier may be a conveyor belt. In still more embodiments, the unpackaged product may be a slab of cheese having a weight greater than or about 5 pounds (lbs).

The present technology also includes a vacuum tool device. The vacuum tool device may include a vacuum port operable to couple to a vacuum source. The vacuum tool device may also include a vacuum manifold that is fluidly connected to the vacuum port. The vacuum manifold may include at least a first manifold conduit and a second manifold conduit. The first and second manifold conduits may each include one or more suction orifices. The vacuum tool may further include an array of suction devices. Each of the suction devices may include a suction cup that has a first end that is reversibly connected to one of the suction orifices. The suction cup may also have a second end that includes an opening that is operable to attach to a product. The diameter ratio of the diameter of the suction orifices to the diameter of the suction cup opening may be less than or about 1:20.

In additional embodiments, each of the suction cups may further include a bellows between the first end and the second end of the suction cup that is operable to extend or compress the suction cup when suctioned onto the product. In further embodiments, the suction devices may be reversibly connected to the suction orifices through leaktight couplings formed in the vacuum manifold. Each of the leaktight couplings may include an inner surface that forms at least a portion of the suction orifice and an outer surface in contact with a connector on the suction device. The leaktight couplings prevent fluids and microbes in the suction devices from reaching the outer surface of the leaktight couplings. In still further embodiments, the array of suction devices may include a first group of suction devices connected to the first manifold conduit, and a second group of suction devices connected to the second manifold conduit. The first and the second group of suction devices may each include greater than or about ten suction devices. In more embodiments, the first manifold conduit and the second manifold conduit may each include a removable end cap that exposes an inner wall of the manifold conduit when opened. In still more embodiments, the vacuum port may be the sole vacuum port on the vacuum manifold.

The present technology further includes vacuum-assisted product-handling methods. The methods may include moving one or more unpackaged products on a carrier into a contact position. The methods may further include attaching the unpackaged products in the contact position to an array of suction devices on a vacuum tool that is connected to a mechanical arm of an actuation unit. A fraction of the suction devices may remain unattached to the unpackaged products. In addition, at least one of the suction devices attached to the unpackaged products may extend to a different length between the vacuum tool and the unpackaged products than at least one other of the suction devices. The methods may still further include lifting the unpackaged products off the carrier with the actuation unit. In additional operations, the methods include detaching the unpackaged products from the suction devices into a receiving container.

In additional embodiments, during the lifting operation, all the suction devices attached to the unpackaged products have the same pressure difference between the interior of the suction device and the exterior of the suction device. In further embodiments, greater than or about five suction devices are attached to each of the unpackaged products when the products are lifted off the carrier. In still further embodiments, the methods include detaching a sheet of packing material from the vacuum tool onto the unpackaged products in the receiving container before the placing of additional unpackaged products in the receiving container. In yet additional embodiments, the methods may include moving a cleaning fluid out of the vacuum tool through the suction devices of the vacuum tool. In more embodiments, the unpackaged products being handled by the present methods may each be a slab of cheese having a weight greater than or about 5 lbs.

Such technology may provide numerous benefits over conventional systems, equipment, and methods of handling products. For example, embodiments of the present systems include the use of fewer vacuum sources than conventional systems. Fewer vacuum sources, including a single vacuum source, reduce the energy needed to independently power a large number of independent vacuum sources. Fewer vacuum sources also reduce maintenance requirements to keep the vacuum sources in operation. Embodiments of the present vacuum tool devices include arrays of suction devices that can be regularly cleaned with clean-in-place operations that reduce the risk of microbial contamination in the handled products. The suction devices may also be independently removed and replaced in the array of devices to reduce repair times and expenses. Embodiments of the present methods include the attachment of multiple suction devices to products that may have rough and uneven surfaces that make them difficult to attach to conventional vacuum-assisted tools. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Figure 1:
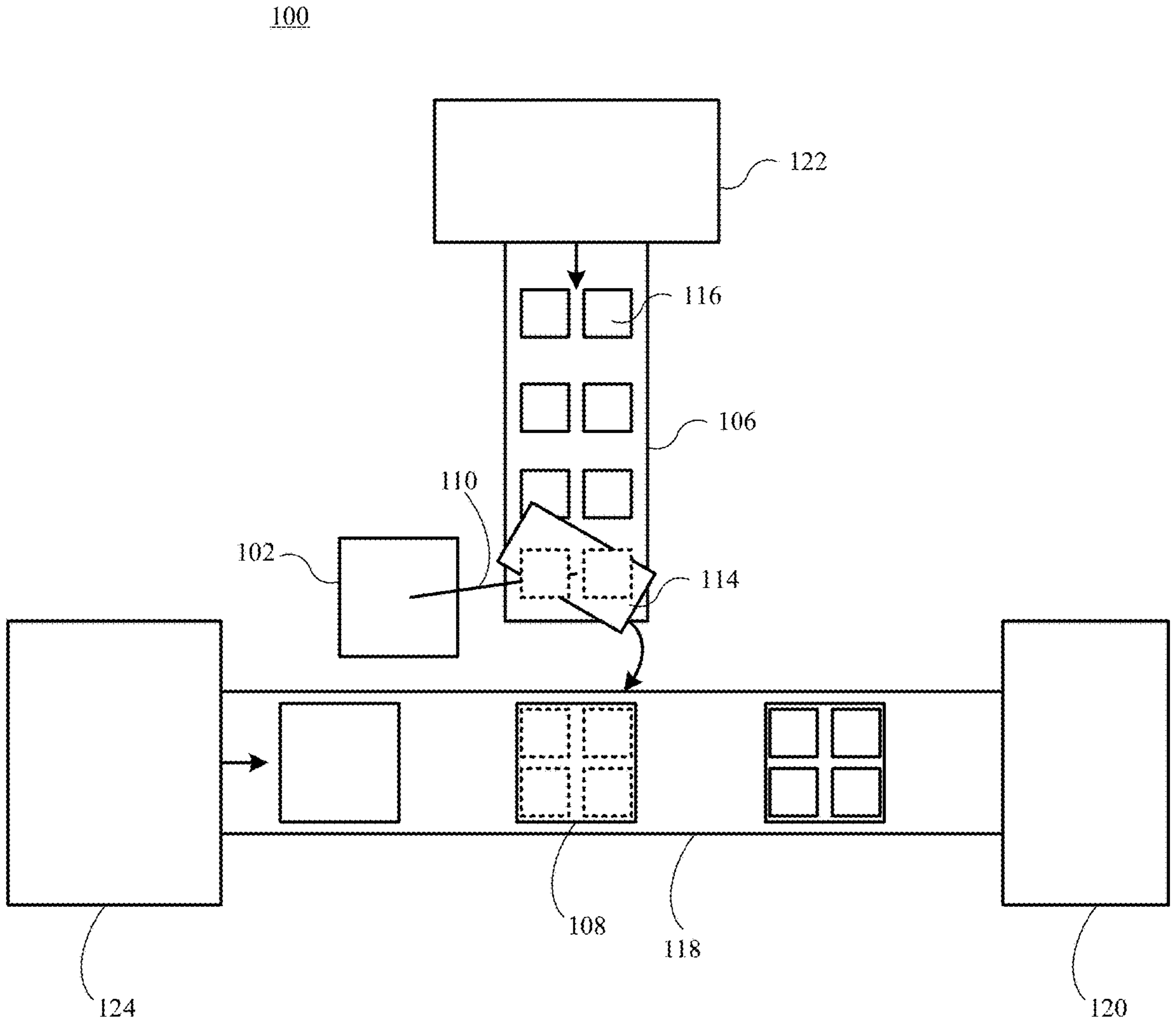
FIG. 1 shows a vacuum-assisted product handling system according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

One aspect of the automation of product manufacturing is moving an unpackaged product from the production area to the packaging area. Some products have the requisite characteristics to fall off a conveyor at the end of a production line into a container that can be boxed up and shipped to a purchaser. In many instances, these products are small, light, rigid, sturdy, non-sticky, and can be randomly oriented in the container. Nails, screws, and other metal fasteners usually meet these criteria. On the other hand, many more products cannot be conveyed from a production line directly into a container and shipped. Many kinds of food products, for example, are too soft, delicate, and sticky to be dropped off a conveyor into a container. Ingredient food products, made in large sizes for food makers and restaurants, are often too heavy and bulky to drop into a container at random orientations. Cheese slabs weighing greater than or about 5 lbs, for example, would deform and knit together if dumped at random orientations into a container. These unpackaged products need to be carefully lifted and carried from a production area and placed in a container.

Automation techniques to lift and carry unpackaged products from production to packaging areas may include mechanical forks and claws that pierce and grab the product in order to lift it off production equipment and into a receiving container. Mechanical Forks that attach the products to the fork by piercing them with one or more tines generally require that the product be rigid enough to hold the inserted tines and soft enough to close and heal the insertion after being moved. For heavy food products like cheese slabs, the products may not be rigid enough to hold the tines of the mechanical fork. They often slip off the fork or break apart around the area of insertion. Mechanical claws can also have great difficulty moving soft, heavy food products like cheese slabs. The claws often cannot secure their grippers on a heavy, deformable cheese slab that easily slips from or through the grippers.

Additional automation techniques to move unpackaged products from production to packaging areas include vacuum tools with at least one suction cup that attaches to the product. The pressure differential between the higher-pressure air outside the suction cup and the lower-pressure volume inside the evacuated cup helps secure the product to the cup. Unfortunately, vacuum tools that use only a few suction cups, or a single suction cup, may have difficultly lifting a soft, heavy product without causing a permanent dome to form in the product where the cup was attached. In addition, large and heavy products like cheese slabs often have rough and uneven surfaces that make it difficult for a suction cup to form and maintain a vacuum seal. There can also be lag times to detach the product from the suction cup by shutting off the vacuum source and waiting for the pressure differential to drop to the point where gravity pulls the product off the vacuum tool.

Embodiments of the present technology address these and other problems with automated equipment, systems, and method to move unpackaged products from a production area to a packaging area. Embodiments of the present technology include vacuum tools that include an array of suction devices that reversibly attach to an unpackaged product, lift and carry the product from a production area, and place the product in a receiving container in a packaging area. In embodiments, the vacuum tools do not use mechanical forks or claws to pierce or grip the unpackaged product. In additional embodiments, the vacuum tools may include an array of suction devices operable to attach to soft and uneven surfaces of an unpackaged product. In embodiments, some of the suction devices can remain unattached while the vacuum tool moves the products. In more embodiments, the suction devices can extend by different lengths to accommodate uneven attachment surfaces on the products. In yet more embodiments, the vacuum tools may be connected to compressed gas reservoirs that supply a pressurized gas for the rapid release of the product into a receiving container.

Embodiments of the present technology also address problems with cleaning the vacuum tools to sanitary levels needed for the handling of food products. Cleaning challenges are particularly difficult for vacuum tools that can vacuum up particles of the food products being moved by the tools. These vacuumed-up particles can act as growth substrates for microbial pathogens and other contaminants that can work their way back into the handled food products. In embodiments, the present vacuum tools can periodically perform a cleaning-in-place (CIP) operation to remove food particles and kill pathogens in the tool. In additional embodiments, the CIP operation may include flowing a cleaning fluid through the tool from the vacuum manifold through the suction devices where the particle-containing cleaning fluid exits the tool. In yet additional embodiments, particles and other contaminants may be removed from the spent cleaning fluid and the decontaminated fluid may be reintroduced to the vacuum tool. In further embodiments, the vacuum tools may include vacuum manifolds that have couplings and can form leaktight seals with the connectors on the suction cups of the suction devices. The leaktight seals prevent fluids and pathogens from corroding and contaminating the connections between the vacuum manifold and the suction devices. In yet additional embodiments, the vacuum manifolds may include one or more removable endcaps that permit easy inspection and cleaning of the interiors of the manifolds.

FIG. 1 shows an embodiment of a vacuum-assisted product handling system 100 according to embodiments of the present technology. In embodiments, system 100 may include an actuation unit 102 adjacent to a product carrier 106 and a receiving container 108. In additional embodiments, the actuation unit 102 may include a mechanical arm 110 attached at one end to an actuator, and attached at an opposite end to a vacuum tool 114. In the embodiment shown, the actuator and mechanical arm 110 move the vacuum tool 114 into a position where suction devices on the vacuum tool can contact and attach to an unpackaged product 116 moved into a contact position by the product carrier 106. In still further embodiments, the vacuum tool 114 attached to the unpackaged product 116 may lift the product off the product carrier 106 with the mechanical force transmitted from the actuator through mechanical arm 110. The unpackaged product 116 lifted by the vacuum tool 114 may be carried to a position over or in the receiving container 108, where the vacuum tool detaches the unpackaged product 116 into the receiving container. In more embodiments, the actuation unit 102 may move additional unpackaged products 116 from the product carrier 106 to the receiving container 108 until the receiving container is filled. In yet more embodiments, the filled receiving container 108 may be moved by a second, receiving container carrier 118 to a storage and shipping area 120. In additional embodiments, the receiving container carrier 118 can move an unfilled receiving container into place for the actuation unit 102 to move more unpackaged products 116 from the unpackaged product carrier 106 to the receiving container 108.

In embodiments, the unpackaged products 116 may be provided by a production area 122 where the unpackaged products are produced or stored. In additional embodiments, the production area 122 may be a cheesemaking area, and the unpackaged products 116 may be cheese slabs made in the cheesemaking area by cheesemaking equipment (not shown). In further embodiments, the cheese slab may have a weight that is greater than or about 2.5 lbs, greater than or about 5 lbs, greater than or about 7.5 lbs, greater than or about 10 lbs, greater than or about 12.5 lbs, greater than or about 15 lbs, greater than or about 17.5 lbs, greater than or about 20 lbs, greater than or about 30 lbs, greater than or about 40 lbs, greater than or about 50 lbs, greater than or about 60 lbs, greater than or about 70 lbs, greater than or about 80 lbs, greater than or about 90 lbs, greater than or about 100 lbs, or more. In yet additional embodiments, the cheese slab may be characterized by a longest dimension of greater than or about 4 inches, greater than or about 5 inches, greater than or about 6 inches, greater than or about 7 inches, greater than or about 8 inches, greater than or about 9 inches, greater than or about 10 inches, greater than or about 11 inches, greater than or about 12 inches, greater than or about 15 inches, greater than or about 18 inches, greater than or about 21 inches, greater than or about 24 inches, or more. In more embodiments, the cheese slab may be characterized by a thickness of greater than or about 1 inch, greater than or about 2 inches, greater than or about 3 inches, greater than or about 4 inches, greater than or about 5 inches, or more. In still more embodiments, the cheese slabs may be formed as one or more kinds of shapes, such as quadrilateral-shaped including square-shaped, rectangular-shaped, parallelogram-shaped, rhombus-shaped, trapezium-shaped, kite-shaped, or irregular-quadrilateral-shaped, among other kinds of quadrilateral shapes. In more embodiments, the cheese slabs may be formed as one or more kinds of additional shapes such as pentagonal-shaped, hexagonal-shaped, heptagonal-shaped, octagonal-shaped, nonagonal-shaped, circular-shaped, and elliptical-shaped, among other kinds of shapes. In still more embodiments, the cheese slabs may be characterized by brine wetness. In yet additional embodiments, the cheese slabs may be characterized by rough surfaces, such as a wavy surface.

In yet further embodiments, the cheese slabs may include one or more types of cheeses selected from natural cheese, pasta filata cheese, processed cheese, and barrel cheese, among other types of cheeses. In still further embodiments, the pasta filata cheeses may include one or more of mozzarella cheese, and pizza cheese, among other types of pasta filata cheese. In more embodiments, the cheese slabs may include provolone cheese, cheddar cheese, colby jack cheese, and gouda cheese, among other types of cheese. In yet more embodiments, the cheese slabs may include cheese characterized by a moisture level, as a percentage of the total weight of the cheese, that is less than or about 80 wt. %, less than or about 75 wt. %, less than or about 70 wt. %, less than or about 65 wt. %, less than or about 60 wt. %, less than or about 55 wt. %, less than or about 50 wt. %, or less.

In additional embodiments, the vacuum tool 114 may be operable to attach and move at least one slab of cheese from the unpackaged product conveyor 106. In further embodiments, the vacuum tool 114 may be operable to attach and move greater than or about two cheese slabs at once, greater than or about three cheese slabs, greater than or about four cheese slabs, greater than or about five cheese slabs, greater than or about six cheese slabs, greater than or about seven cheese slabs, greater than or about eight cheese slabs, greater than or about nine cheese slabs, greater than or about ten cheese slabs, or more. In still further embodiments, the vacuum tool 114 may be operable to attach a group of cheese slabs arranged in a square or rectangular array.

In embodiments, the product carrier 106 may include a conveyor belt that is operable to move unpackaged products 116 from a production area 122, where the unpackaged products are produced or stored, to a contact position where the vacuum tool 114 can contact and attach to the products. In additional embodiments, the product carrier 106 may be temperature controlled. In further embodiments, the product carrier 106 may be cooled by a cooling unit (not shown) to a temperature of less than or about 20° C., less than or about 15° C., less than or about 10° C., less than or about 5° C., less than or about 1° C., or less. In still further embodiments, the product carrier 106 may be heated by a heating unit (not shown) to a temperature of greater than or about 25° C., greater than or about 30° C., greater than or about 35° C., greater than or about 40° C., greater than or about 45° C., greater than or about 50° C., or more.

In additional embodiments, the receiving container carrier 118 may include a conveyor belt that is operable to move a receiving container 108 from a receiving container supply area 124 into a place where the actuation unit 102 can move more unpackaged products 116 from the unpackaged product carrier 106 to the receiving container. In more embodiments, the receiving container carrier 118 may also be operable to move a filled receiving container 108 from the place where the actuation unit 102 fills the receiving container to a shipping area 120 where the filled receiving container can be stored and shipped.

In embodiments, the receiving container 108 may be capable of holding one or more of the unpackaged products 116 placed in container buy the vacuum tool 114 of the actuation unit 102. In further embodiments, the receiving container 108 may be capable of holding unpackaged products in an amount greater than or about two products, greater than or about five products, greater than or about 10 products, greater than or about 20 products, greater than or about 30 products, greater than or about 40 products, greater than or about 50 products, greater than or about 60 products, greater than or about 70 products, greater than or about 80 products, greater than or about 90 products, greater than or about 100 products, or more. In still further embodiments, the receiving container 108 may include an open, top side through which the vacuum tool 114 places the unpackaged products, and a closed bottom side opposite the side of the container. In yet more embodiments, the bottom side of the container may have a bottom area that can accommodate adjacently positioned products resting directly on the bottom area. In embodiments, the bottom area can accommodate two or more products, three or more products, four or more products, five or more products, six or more products, seven or more products, eight or more products, nine or more products, ten or more products, or more. In additional embodiments, at least two adjacent products may be rotated relative to each other to increase the packing density when the products have a different thickness between one side of the product and another side, such as an opposite side. In embodiments, the at least two adjacent products in the may be rotated relative to each other by at least 45°, at least 90°, or at least 180°, among other rotational angles. In more embodiments, the rotation of the adjacent products may be accomplished by rotating the vacuum tool 114 before placing the products into the receiving container 108.

The vacuum-assisted product handling system 100 may also include one or more sensors (not shown) to detect the position of the unpackaged products 116. In embodiments, system 100 may include a sensor that detects the position of unpackaged products 116 on the product conveyor 106. In further embodiments, the sensor is operable to provide a signal to the actuation unit 102 when an unpackaged product 116 is in a contact position so the actuation unit can move the vacuum tool 114 into place to attach to the unpackaged product. In still further embodiments, system 100 may include a sensor that detects the position of products placed in the receiving container 108. In embodiments, the sensor is operable to provide a signal to the actuation unit 102 that one or more products have been received in the receiving container 108. In still more embodiments, system 100 may include a sensor that detects the position of the receiving container 108 on the receiving container carrier 118. In embodiments, the sensor is operable to provide a signal to the actuation unit 102 that a receiving container 108 is in place to receive products. In additional embodiments, system 100 may include one or more sensors such as optical sensors, pressure sensors, vacuum sensors, and motion sensors, among other types of sensors.

Figure 2:
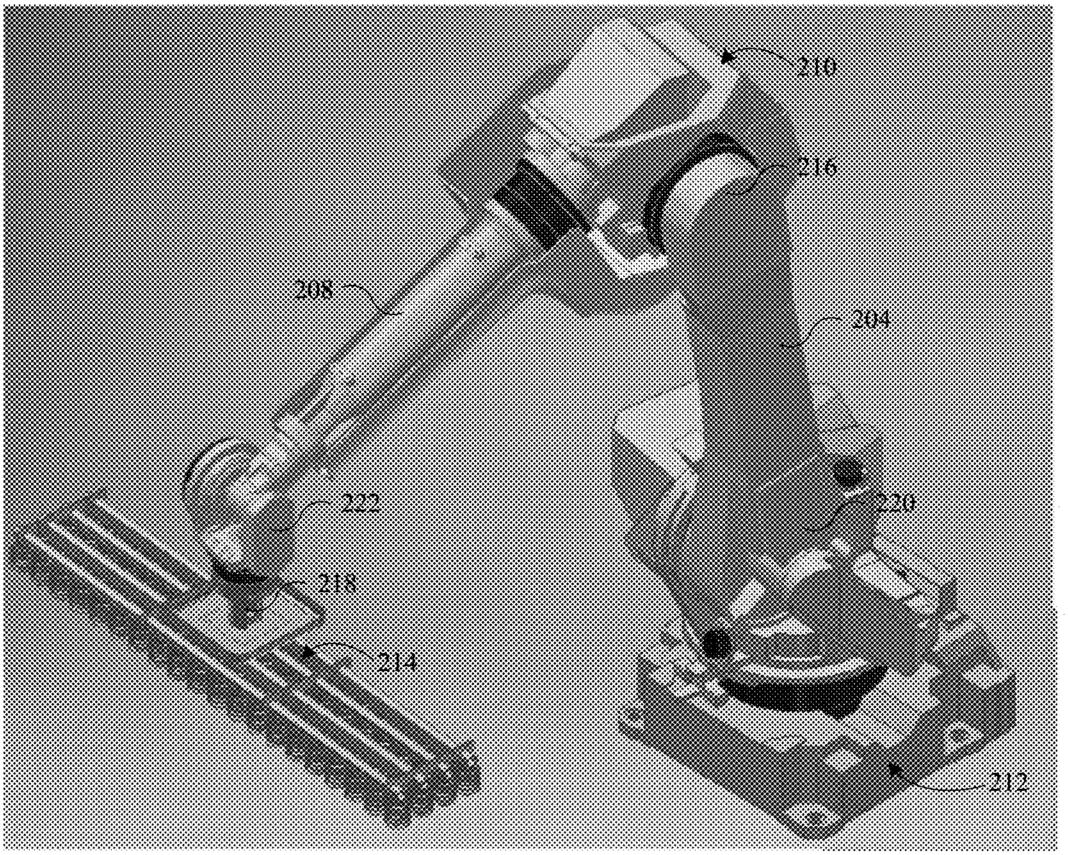
FIG. 2 shows an actuation unit of a vacuum-assisted product handling system according to embodiments of the present technology.

FIG. 2 shows an embodiment of an actuation unit 200 according to embodiments of the present technology. In the embodiment shown, the actuation unit 200 may include an actuator 212 attached to one end of a mechanical arm 210 and a vacuum tool 214 attached to an opposite end of the mechanical arm 210. In additional embodiments, the mechanical arm 210 may include a first arm 204 and a second arm 208 that are connected at a pivot area 216. An end of the first arm 204, opposite the pivot area 216, may be connected to the actuator 212, and an end of the second arm 208, opposite the pivot area, may be attached to the vacuum tool 214 by a mount 218 positioned in the center of the vacuum tool.

In embodiments, the actuation unit 200 may include at least two degrees of freedom, at least three degrees of freedom, at least four degrees of freedom, at least five degrees of freedom, or more. In additional embodiments, the actuation unit 200 may include a degree of freedom characterized by the rotation of the mechanical arm 210 about a point where the mechanical arm engages with the actuator 212. In further embodiments, the actuation unit 200 may include a degree of freedom characterized by a pivot motion of the first arm 204 from pivot area 220, where the arm is connected to the actuator. In still further embodiments, the actuation unit 200 may include a degree of freedom characterized by a pivot motion between the first arm 204 and the second arm 208 at the pivot area 216. In more embodiments, the actuation unit 200 may include a degree of freedom characterized by a pivot motion between the second arm 208 and the vacuum tool 214 at the pivot area 222. In still more embodiments, the actuation unit 200 may include a degree of freedom characterized by the rotation of vacuum tool 214 about the end of second arm 208.

In additional embodiments, the actuation unit 200 may include a microcontroller (not shown) that is operable to execute commands for the movement of the components of the actuation unit in a concerted manner. In embodiments, the microcontroller may be programmed to execute a series of commands that cause it to generate one or more instruction signals that cause the independent movement of the components of the actuation unit at one or more pivot areas and rotation points. In more embodiments, a program that includes the series of commands for the actuation unit 200 may be stored in semiconductor-based memory on the actuation unit, and in additional embodiments, the program may be provided by a computer or command unit that is separate from the actuation unit.

Figure 3:
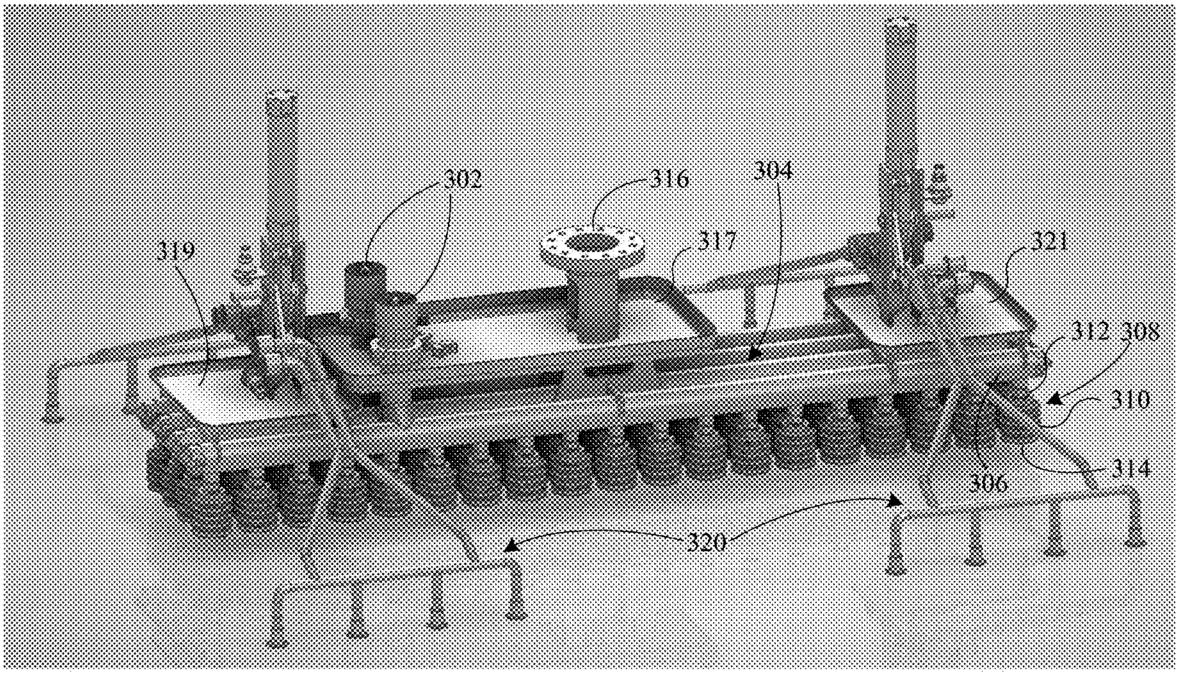
FIG. 3 shows a vacuum tool component of a vacuum-assisted product handling system according to embodiments of the present technology.

FIG. 3 shows a vacuum tool 300 of a vacuum-assisted product handling system according to embodiments of the present technology. In embodiments, the vacuum tool 300 may include at least one vacuum port 302 connected to a vacuum manifold 304 that includes one or more vacuum manifold conduits 306. In additional embodiments, each of the vacuum manifold conduits 306 may include one or more suction orifices that are each reversibly coupled to a suction device 308. In still further embodiments, each suction device 308 may include a suction cup 310 that includes a connector 312 reversibly coupled to a vacuum manifold conduit 306 at one end, and an opening 314 at the opposite end where the suction device can attach to a product.

In embodiments, at least one vacuum port 302 may be coupled to a vacuum source (not shown) that reduces the gas pressure in the vacuum manifold 304. It will be appreciated that the pressure in the vacuum manifold 304 is characterized by pressure fluctuations that depend on the activation of the vacuum source and the attachment of the vacuum tool 300 to one or more products, among other factors. In additional embodiments, the vacuum manifold 304 may be characterized by a minimum gauge pressure (measured at 14.7 psi atmospheric pressure) during a product handling operation of less than or about −1 psig, less than or about −2 psig, less than or about −3 psig, less than or about −4 psig, less than or about −5 psig, less than or about −6 psig, less than or about −7 psig, less than or about −8 psig, less than or about −9 psig, less than or about −10 psig, or less. In yet additional embodiments, the pressure may be reduced from atmospheric pressure to the above-described minimum gauge pressure is less than or about 5 seconds, less than or about 2.5 seconds, less than or about 1 second, less than or about 0.5 seconds, less than or about 0.25 seconds, less than or about 0.1 second, or less. In more embodiments, each of the vacuum manifold conduits 306 in the vacuum manifold 304 may be characterized by a maximum airflow through the conduit of greater than or about 10 standard cubic feet per minute (SCFM), greater than or about 20 SCFM, greater than or about 30 SCFM, greater than or about 40 SCFM, greater than or about 50 SCFM, greater than or about 60 SCFM, greater than or about 70 SCFM, greater than or about 80 SCFM, greater than or about 90 SCFM, greater than or about 100 SCFM, or more. In further embodiments, at least one vacuum port 302 may be coupled to a single vacuum source operable to reduce the pressure in the vacuum manifold 304 to the above-described minimum pressure in the above-described timeframe. In still further embodiments, at least one vacuum port 302 may be coupled to greater than or about two vacuum sources, greater than or about three vacuum sources, greater than or about four vacuum sources, or more.

In additional embodiments, at least one vacuum port 302 may also be coupled to a compressed gas reservoir (not shown) that rapidly increases the gas pressure in the vacuum manifold 304 when the vacuum tool 300 is ready to detach a product. In embodiments, a gas valve (not shown) may be used to switch the fluid coupling of at least one vacuum port 302 from the vacuum source to the compressed gas reservoir. In more embodiments, the compressed gas reservoir may increase the pressure in the vacuum manifold 304 to greater than atmospheric pressure in less than or about 1 second, less than or about 0.5 seconds, less than or about 0.25 second, less than or about 0.1 second, or less. In still more embodiments, the compressed gas may be compressed air or compressed nitrogen.

In still additional embodiments, at least one vacuum port 302 may be in fluid communication with all the vacuum manifold conduits 306 in the vacuum manifold 304 so that the vacuum conduits are characterized by the same pressure fluctuations. In more embodiments, the number of vacuum manifold conduits 306 in vacuum manifold 304 may be greater than or about one vacuum manifold conduit, greater than or about two vacuum manifold conduits, greater than or about two vacuum manifold conduits, greater than or about two vacuum manifold conduits, greater than or about three vacuum manifold conduits, greater than or about four vacuum manifold conduits, greater than or about five vacuum manifold conduits, greater than or about six vacuum manifold conduits, greater than or about seven vacuum manifold conduits, greater than or about eight vacuum manifold conduits, or more. In still more embodiments, the vacuum manifold conduits may have a tubular shape characterized by an inner diameter of greater than or about 0.5 inches, greater than or about 0.75 inches, greater than or about 1 inch, greater than or about 1.25 inches, greater than or about 1.5 inches, greater than or about 1.75 inches, greater than or about 2 inches, greater than or about 2.5 inches, greater than or about 3 inches, or more.

In further embodiments, each of the vacuum manifold conduits 306 may include at least one suction orifice that is operable to reversibly could to a suction device 308. In embodiments, each vacuum manifold 306 may include a number of suction orifices that is greater than or about one suction orifice, greater than or about two suction orifices, greater than or about three suction orifices, greater than or about four suction orifices, greater than or about five suction orifices, greater than or about ten suction orifices, greater than or about fifteen suction orifices, greater than or about twenty suction orifices, or more. In more embodiments, a suction device 308 is reversibly coupled to each of the suction orifices to form an array of suction devices. In still more embodiments, vacuum tool 300 may include an array of suction devices 308 that includes greater than or about two suction devices, greater than or about five suction devices, greater than or about ten suction devices, greater than or about twenty suction devices, greater than or about thirty suction devices, greater than or about forty suction devices, greater than or about fifty suction devices, greater than or about seventy-five suction devices, greater than or about one hundred suction devices, or more.

In more embodiments, the vacuum tool 300 may also include a mount 316 that is operable to connect the vacuum tool to the end of a mechanical arm of an actuator unit. In embodiments, the mount 316 may include a flanged end that is operable to fasten to the end of the mechanical arm with two or more fasteners. The fastened end of the mount 316 may permit the rotation of the vacuum tool 300 about the end of the mechanical arm. In additional embodiments, the vacuum tool 300 may include pans 317, 319, 321, to prevent the exposure of a least a portion of the components on the actuation unit to the products that are reversibly attached to the tool. In still more embodiments, the pans 317, 319, 321 block food particles and droplets dislodged from the products from contacting and contaminating the shielded portions of the vacuum tool 300 and the actuation unit.

In yet more embodiments, the vacuum tool 300 may further include a group of suction devices 320 that are operable to vacuum attach a sheet of packaging material (not shown) to the vacuum tool. In embodiments, the group of suction devices 320 may be fluidly connected to the same one or more vacuum sources as the vacuum manifold 304. In additional embodiments, the group of suction devices 320 may be fluidly connected to a different vacuum source than the vacuum manifold 304. In more embodiments, the group of suction devices 320 may extend beyond the vacuum manifold 304 and include suction devices near the corners of the sheet of packaging material. In still further embodiments, the sheet of packaging material may include a sheet made of plastic, paper, or another type of packaging material.

Figure 4:
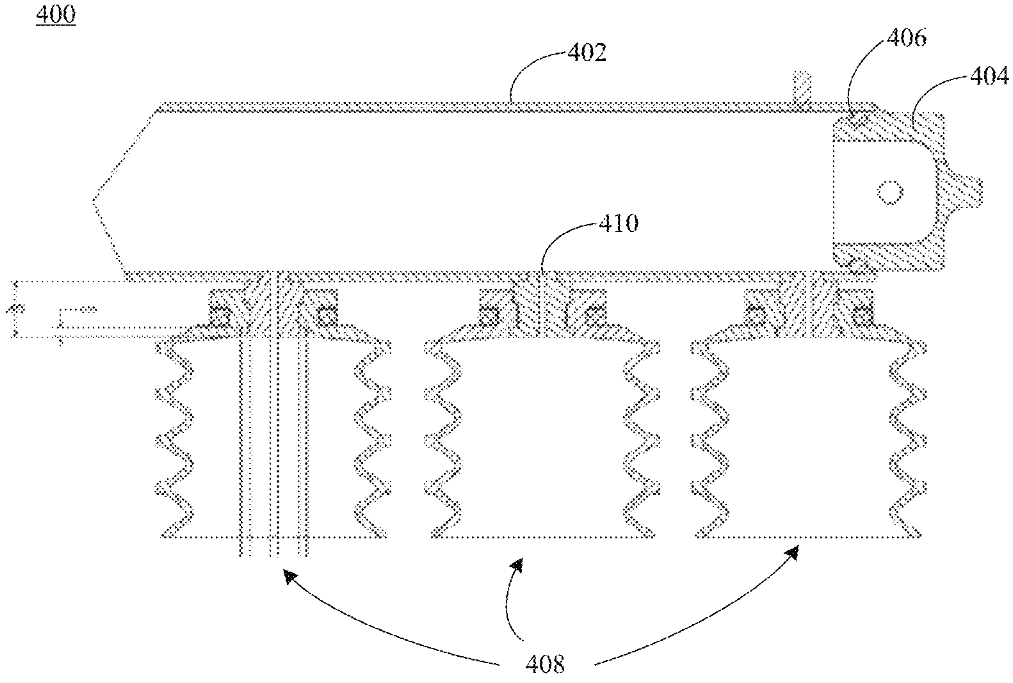
FIG. 4 shows a portion of a vacuum manifold and suction devices in a vacuum tool component of a vacuum-assisted product handling system according to embodiments of the present technology.

FIG. 4 shows a portion of a vacuum tool 400 that includes a portion of a manifold conduit 402 with a removable endcap 404 according to embodiments of the present technology. In embodiments, the removable endcap 404 may be leaktightly attached to an end of the vacuum manifold conduit 402 with a sealing gasket 406 (e.g., an o-ring made of an elastomeric polymer) pressed between an outer surface of the endcap and an inner surface of the conduit. In further embodiments, the endcap 404 may be secured on the end of the vacuum manifold conduit 402 with a removable pin that traverses openings in both the endcap and the conduit. In yet further embodiments, the endcap may be threadless to prevent the buildup of food particles and pathogenic microbes in the groves between the threads.

In embodiments, the endcap 404 may be removed when the vacuum tool 400 is not handling products to inspect the interior surfaces of the vacuum manifold conduit 402 for debris and corrosion. In further embodiments, endcaps may be secured to both ends of the vacuum manifold conduit 402 to permit inspection of the interior of the conduit for either end. The removable endcaps 404 permit rapid inspection of the interior surfaces of the vacuum manifold conduits 402 in the vacuum tool 400.

Figure 5A:
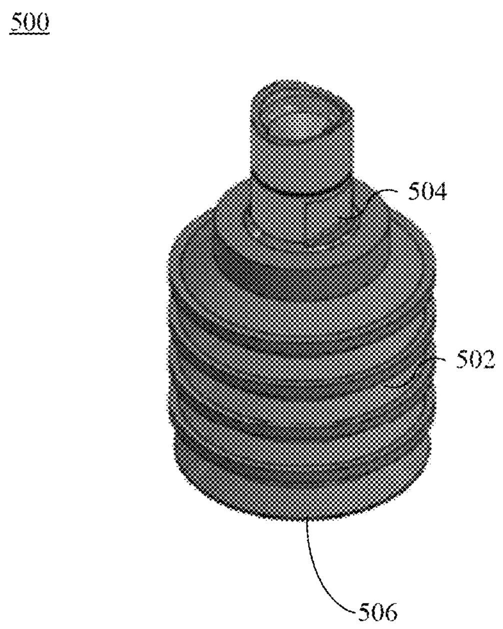
FIG. 5A shows a three-dimensional view of a portion of a suction device for incorporation into a vacuum-assisted product handling system according to embodiments of the present technology.
Figure 5B:
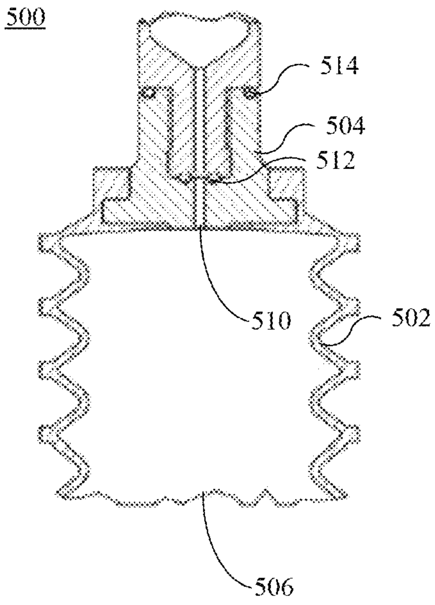
FIG. 5B shows a cross-sectional view of a portion of a suction device for incorporation into a vacuum-assisted product handling system according to embodiments of the present technology.

In additional embodiments, vacuum tool 400 may also include a series of suction devices 408, each of which is reversibly and leaktightly coupled to a suction orifice 410 formed in the vacuum manifold conduit 402. FIG. 5A and FIG. 5B show additional details of an embodiment of a suction device 500 like the suction devices 408 shown in FIG. 4. In embodiments, suction device 500 may include a suction cup 502 that includes a first end having a connector 504 that can reversibly and leaktightly connect the suction device to a vacuum manifold conduit. The suction cup 502 also includes an opening 506 at the opposite end where the suction device can attach to a product.

In further embodiments, the connector 504 may have a small inner diameter that forms a portion of a suction conduit 510, which may also be formed by the suction orifice of the vacuum manifold conduit. In embodiments, the suction conduit 510 may have a diameter that is significantly smaller than the diameter of the opening 506 at the opposite end of the suction cup. In additional embodiments, the ratio of the diameter of the suction conduit 510 to the diameter of the opening 506 may be less than or about 1:10, less than or about 1:15, less than or about 1:20, less than or about 1:25, less than or about 1:30, less than or about 1:35, less than or about 1:40, less than or about 1:45, less than or about 1:50, or less.

In more embodiments, the inner diameter of the connector 504 and the diameter of the suction orifice may be the same diameter. In still more embodiments, the suction conduit 510 formed by the inner diameter of the connector 504 and the suction orifice may have a length that is significantly longer than its diameter. In embodiments, the ratio of the length of the suction conduit 510 to its diameter may be greater than or about 2:1, greater than or about 3:1, greater than or about 4:1, greater than or about 5:1, greater than or about 6:1, greater than or about 7:1, greater than or about 8:1, greater than or about 9:1, greater than or about 10:1, or more. In further embodiments, the length of the suction conduit 510 may be greater than or about 0.5 inches, greater than or about 1 inch, greater than or about 1.25 inches, greater than or about 1.5 inches, greater than or about 1.75 inches, greater than or about 2 inches, greater than or about 2.25 inches, greater than or about 2.5 inches, greater than or about 2.75 inches, greater than or about 3 inches, or more. In still further embodiments, the diameter of the suction conduit 510 may be less than or about 0.5 inches, less than or about 0.25 inches, less than or about 0.125 inches, less than or about 0.0625 inches, less than or about 0.03125 inches, or less.

In further embodiments, the long, narrow suction conduit 510 fluidly connecting the suction device 500 to the vacuum manifold conduit provides a sufficient flow of air into and out of the interior of the suction cup 502 from the vacuum manifold. In embodiments, the fluid flow through the suction conduit 510 may be greater than or about 10 cubic inches per second (CuIn/S), greater than or about 20 CuIn/S, greater than or about 30 CuIn/S, greater than or about 40 CuIn/S, greater than or about 50 CuIn/S, greater than or about 60 CuIn/S, greater than or about 70 CuIn/S, greater than or about 80 CuIn/S, greater than or about 90 CuIn/S, greater than or about 100 CuIn/S, or more.

In embodiments, the long, narrow suction conduit 510 fluidly connecting the suction device 500 to the vacuum manifold conduit also reduces the amount of air entering the vacuum manifold from an unattached suction device when the manifold has a negative pressure relative to the outside atmosphere. In further embodiments, one or more suction devices in the array of suction devices on the vacuum tool may be unattached while holding a product without a pressure increase in the vacuum manifold of the vacuum tool that causes the product to detach prematurely. In still further embodiments, the percentage of unattached suction devices on a vacuum tool holding a product may be greater than or about 5%, greater than or about 10%, greater than or about 15%, greater than or about 20%, greater than or about 25%, greater than or about 30%, greater than or about 35%, greater than or about 40%, greater than or about 45%, greater than or about 50%, or more.

In additional embodiments, the suction device 500 includes a connector 504 that is leaktightly sealed from both the interior volume of the suction cup 502 and the fluids moving through the vacuum manifold of the vacuum tool. In further embodiments, the connector 504 may be operable to hold a first sealing gasket 512 to prevent the flow of fluids from the interior of the suction cup 502 into an interior portion of the connector. In more embodiments, the connector 504 may be operable to hold a second sealing gasket 514 to prevent the flow of fluids from the interior of the vacuum manifold into an interior portion of the connector. In still more embodiments, the first and second sealing gaskets 512 and 514 may be o-rings made of a food-grade elastomeric polymer. In embodiments, the first and second sealing gaskets 512 and 514 prevent liquids and food particles from infiltrating the interior portion of the connector 504 and cause corrosion, the growth of pathogenic microbes, or both. In further embodiments, the ability of the leaktight connector 504 to decouple from the vacuum manifold conduit permits the independent replacement of suction devices 500 without having to dismantle the vacuum manifold.

In further embodiments, the suction cup 502 of the suction device 500 may be a bellows-style suction cup that permits expansion and contraction in a direction that is substantially perpendicular to the plane of the opening 506. In more embodiments, the suction cup 502 may be made of a flexible, elastomeric polymer such as a silicone polymer approved for food handling. In embodiments, the bellows and elastomeric polymer materials make the suction cups 502 more vertically flexible to accommodate uneven surfaces in the product attached to the array of suction devices.

Figure 6:
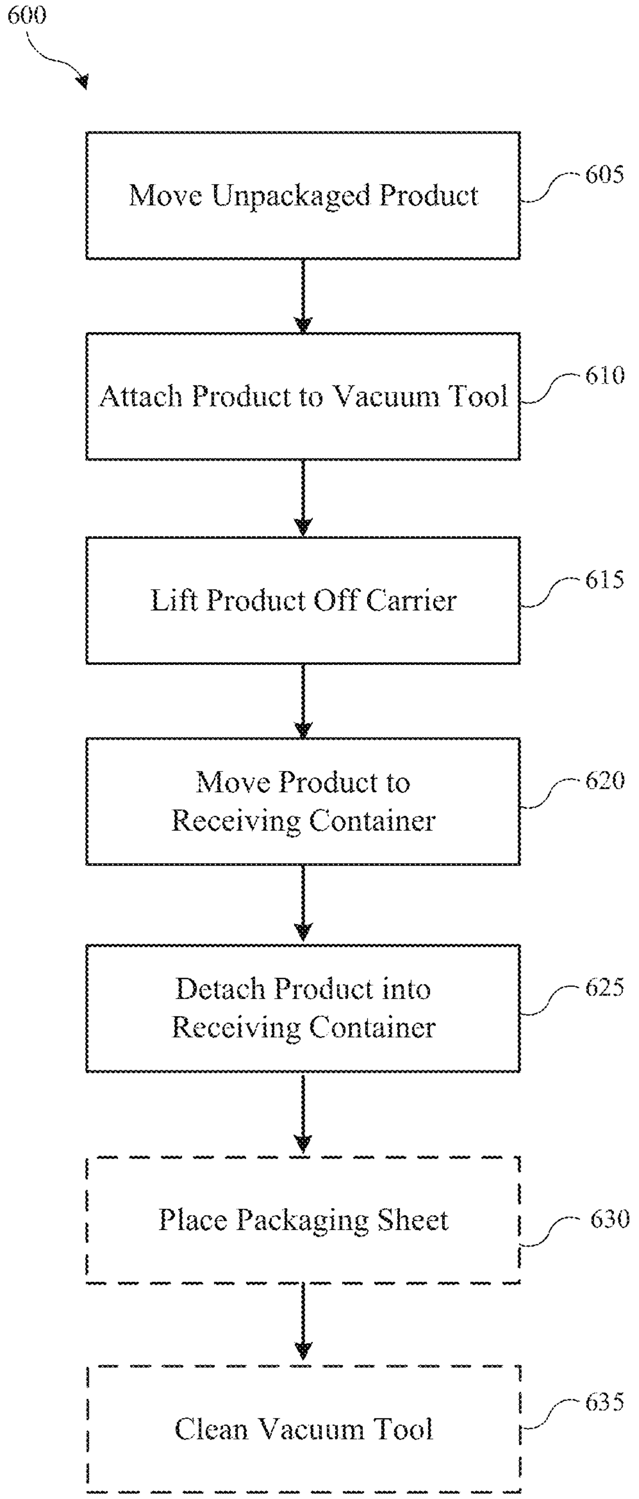
FIG. 6 shows a flowchart of selected operations in a method of handling a product with a vacuum-assisted product handling system according to embodiments of the present technology.

FIG. 6 shows selected steps in a flowchart for a vacuum-assisted product-handling method 600 according to embodiments of the present technology. In embodiments, method 600 may include moving one or more unpackaged products into a contact position at operation 605. In further embodiments, the one or more unpackaged product may be a food product such as a slab of cheese. In additional embodiments, the unpackaged product may be moved into a contact position by a carrier such as a conveyor. In still further embodiments, the carrier may include one or more components to change the orientation of an unpackaged product on the carrier. In more embodiments, these components may include a bump turn conveyor that rotates the unpackaged product on the conveyor by, for example, greater than or about 10°, greater than or about 30°, greater than or about 45°, greater than or about 60°, greater than or about 75°, greater than or about 90°, among other rotational angles. In more embodiments, the carrier may have a length in the direction of travel and a width perpendicular to the direction of travel. In further embodiments, one unpackaged product may be placed within the width of the carrier. In still further embodiments, more than one unpackaged product may be placed within the width of the carrier, such two unpackaged products, three unpackaged products, four unpackaged products, or more.

Method 600 may further include attaching a vacuum tool to one or more unpackaged products in the contact position at operation 610. In embodiments, the vacuum tool may be connected to an actuation unit through a mechanical arm that moves an array of suction devices on the vacuum tool into contact with the unpackaged products. In further embodiments, the vacuum tool may attach to an unpackaged product with less than all the suction devices in contact with the product making a vacuum seal with the product's surface. In still further embodiments, the vacuum tool may attach to an unpackaged product with one or more contacting suction devices not making a vacuum seal, two or more contacting suction devices not making a vacuum seal, three or more contacting suction devices not making a vacuum seal, four or more contacting suction devices not making a vacuum seal, or more. The present technology permits the vacuum tool to make a vacuum attachment to an unpackaged product with an uneven product surface where not all the suction devices in contact with the product can make a vacuum seal.

Method 600 may also include lifting one or more unpackaged products off the carrier with the attached vacuum tool at operation 615. In embodiments, the vacuum tool may lift off a number of unpackaged products that is greater than or about one, greater than or about two, greater than or about three, greater than or about four greater than or about five greater than or about ten, greater than or about fifteen, greater than or about twenty, or more. In further embodiments, the vacuum tool may lift off one or more unpackaged products having a total weight of greater than or about 2 lbs, greater than or about 5 lbs, greater than or about 10 lbs, greater than or about 12 lbs, greater than or about 15 lbs, greater than or about 20 lbs, greater than or about 30 lbs, greater than or about 40 lbs, greater than or about 50 lbs, or more. In yet further embodiments, the vacuum tool is able to lift off the unpackaged product because of a pressure difference between the pressure inside the attached suction cups of the suctions devices and the pressure of the atmosphere outside the product. In embodiments, the pressure difference permits each suction device to attach and hold a weight of the product that is greater than or about 1 lb, greater than or about 2 lbs, greater than or about 3 lbs, greater than or about 4 lbs, greater than or about 5 lbs, greater than or about 7.5 lbs, greater than or about 10 lbs, greater than or about 12.5 lbs, greater than or about 15 lbs, greater than or about 17.5 lbs, greater than or about 20 lbs, greater than or about 30 lbs, greater than or about 40 lbs, greater than or about 50 lbs, greater than or about 60 lbs, greater than or about 70 lbs, greater than or about 80 lbs, greater than or about 90 lbs, greater than or about 100 lbs, or more.

Method 600 may still further include moving the one or more unpackaged products to the receiving container at operation 620. In embodiments, the vacuum tool holding the unpackaged products may be moved by a mechanical arm attached to an actuator that moves the arm from a position above the unpackaged product carrier to a position over or within the receiving container. In further embodiments, the movement of the vacuum tool may include a series of programmed motions caused by signals transmitted by a microcontroller unit integrated into the actuation unit that includes the vacuum tool or a computer in electronic communication with the actuation unit.

Method 600 may still also include detaching one or more unpackaged products from the vacuum tool into the receiving container at operation 625. In embodiments, the unpackaged products may be detached by disconnecting a vacuum source from the vacuum tool resulting in an increase in pressure in the vacuum tool from a flow of outside air into the vacuum tool. In other embodiments, the products may be detached by switching from a vacuum source evacuating the vacuum tool to a compressed gas reservoir that provides a rapid flow of gas into the vacuum tool. The rapid flow of gas from the compressed gas reservoir causes the pressure to rapidly increase in the vacuum tool and causing the products held on the vacuum tool to rapidly detach into the receiving container. In embodiments, the time between starting the flow of the compressed gas into the vacuum tool and the detachment of the unpackaged products may be less than or about 1 second, less than or about 0.5 seconds, less than or about 0.25 second, less than or about 0.1 second, or less.

Method 600 may also optionally include placing a packaging sheet in the receiving container at operation 630. In embodiments, a vacuum tool may attach to the packaging sheet in a packaging supply area using packaging suction devices connected to the vacuum tool. In further embodiments, the packaging suction devices may be different from the product suction devices of the vacuum tool that attach to the unpackaged products. In additional embodiments, the packaging suction devices may be fewer in number and have a lower pressure difference with the surrounding air than the product suction devices. In still further embodiments, the packaging suction devices may extend further from the center of the vacuum tool than the array of product suction devices.

In embodiments, the vacuum tool, holding the packaging sheet by vacuum attachment to the packaging suction devices, may place the packaging sheet in the receiving container and detach it onto a surface of the container or onto one or more products placed in the container. In further embodiments, method 600 may include two or more cycles of placing products and packaging sheets in the receiving container to build up alternating layers of products and packaging sheets in the container. In still further embodiments, the packaging sheet may be made of plastic or paper. In yet more embodiments, the packaging sheet may have a longest dimension of greater than or about 1 foot, greater than or about 2 feet, greater than or about 3 feet, greater than or about 4 feet, greater than or about 5 feet, or more. In embodiments, the packaging sheet can act as a barrier to prevent stacked products such as cheese slabs from sticking or knitting together.

Method 600 may further optionally include cleaning the vacuum tool at operation 635. In embodiments, the cleaning operation may include a clean-in-place (CIP) operation that places the suction devices of the vacuum tool into a cleaning fluid that is taken up into the suction devices and the vacuum manifold of the vacuum tool. In additional embodiments, the cleaning fluid may be purged from the vacuum tool by switching from a vacuum source that maintains negative pressure in the vacuum tool to a compressed gas reservoir that applied positive pressure to the vacuum tool. In still further embodiments, a positive pressure may be maintained until the vacuum manifold and suction devices of the vacuum tool have been purged of the cleaning fluid and dried. In further embodiments, the cleaning fluid may be an aqueous solution that includes one or more cleaning agents chosen from halogen compounds, ammonium-salt compounds, organic acids, surfactants, detergents, antimicrobial agents, and antifungal agents, among other cleaning agents. In still further embodiments, the cleaning fluid may include chlorinated caustic detergents.

In embodiments, the cleaning operation 635 may be performed after each product handling cycle that moves one or more unpackaged products from a carrier to a receiving device. In additional embodiments, a cleaning operation may be performed after a number of product handling cycles such as two or more product handling cycles, three or more product handling cycles, five or more product handling cycles, ten or more product handling cycles, twenty or more product handling cycles, or more.

Embodiments of the present technology like the above-described systems, equipment, and methods provide ways to automate product handling, such as the movement of cheese slabs from a cheese production area to a receiving container where the cheese slabs are packaged. The vacuum-assisted product handling systems and methods may include an array of suction devices that reversibly attach to an unpackaged product, lift and carry the product from a production area, and place the product in a receiving container in a packaging area. The vacuum tools do not use mechanical forks or claws to pierce or grip the unpackaged product. The suction devices can attach to soft and uneven surfaces of products, such as cheese slabs, and some of the suction devices can remain unattached while the vacuum tool moves the products. The present technology also permits fast and frequent clean-in-place (CIP) operations that remove food particles and kills any contaminating pathogens when the systems and methods are handling food products.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology. Additionally, methods or processes may be described as sequential or in steps, but it is to be understood that the operations may be performed concurrently, or in different orders than listed.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms “a”, “an”, and “the” include plural references unless the context clearly dictates otherwise. Thus, for example, reference to “a trench” includes a plurality of such trenches, and reference to “the layer” includes reference to one or more layers and equivalents thereof known to those skilled in the art, and so forth.

Also, the words “comprise(s)”, “comprising”, “contain(s)”, “containing”, “include(s)”, and “including”, when used in this specification and in the following claims, are intended to specify the presence of stated features, integers, components, or operations, but they do not preclude the presence or addition of one or more other features, integers, components, operations, acts, or groups.

The invention claimed is:

1. A vacuum-assisted product-handling system comprising:
- a carrier;
- an actuation unit movable from a contact position of the carrier to a receiving container, wherein the actuation unit further comprises:
  - a mechanical arm, and
  - a vacuum tool connected to an end of the mechanical arm, wherein the vacuum tool comprises one or more arrays of suction devices comprising one or more suction devices, and a vacuum manifold comprising one or more suction orifices, wherein each suction device of the one or more arrays of suction devices is connected to a suction orifice of the one or more suction orifices through a connector of the respective suction device, wherein the connector of the suction device and the suction orifice define a suction conduit having a length and a diameter, and further wherein the one or more arrays of suction devices are connected to a single vacuum source; and a compressed gas reservoir operable to apply positive pressure to the vacuum tool and purge a cleaning liquid through the vacuum manifold and out of the one or more arrays of suction devices.

2. The vacuum-assisted product-handling system of claim 1, wherein at least one of the suction devices of the vacuum tool is unattached to an unpackaged product as the actuation unit moves the unpackaged product from the carrier to the receiving container.

3. The vacuum-assisted product-handling system of claim 1, wherein the single vacuum source comprises a vacuum pump operable to maintain a vacuum in the suction devices attached to an unpackaged product.

4. The vacuum-assisted product-handling system of claim 1, wherein the system further comprises an array of sheet holding suction devices extending from the vacuum tool, wherein the array of sheet holding suction devices extend beyond a perimeter of the vacuum manifold.

5. The vacuum-assisted product-handling system of claim 1, wherein the array of suction devices comprises 25 or greater suction devices.

6. The vacuum-assisted product-handling system of claim 1, wherein the carrier comprises a conveyor belt.

7. The vacuum-assisted product-handling system of claim 1, wherein the mechanical arm is operable to lift an unpackaged product, the unpackaged product comprising a slab of cheese having a weight greater than or about 5 lbs.

8. A vacuum tool device comprising:

a vacuum port fluidly coupled to a vacuum source;

a vacuum manifold fluidly connected to the vacuum port, wherein the vacuum manifold comprises at least a first manifold conduit and a second manifold conduit, and wherein the first and the second manifold conduits each comprise one or more suction orifices;

an array of suction devices, wherein each suction device of the array of suction devices comprises a suction cup that has a first end which is reversibly connected to one of the suction orifices, and a second end that includes an opening which is operable to attach to a product, wherein a diameter ratio of a diameter of the one or more suction orifices to a diameter of the suction cup opening is less than or about 1:20, and wherein the array of suction devices is connected to a single vacuum source; and wherein the vacuum port is fluidly coupled to a compressed gas reservoir operable to apply positive pressure to the vacuum port and purge a cleaning liquid through the vacuum manifold and out of the array of suction devices.

9. The vacuum tool device of claim 8, wherein each suction cup further comprises a bellows between the first end and the second end of the suction cup, wherein the bellows comprises an extended position and a compressed position when suctioned onto a product.

10. The vacuum tool device of claim 8, wherein each suction device of the array of suction devices are reversibly connected to a suction orifice of the one or more suction orifices through leaktight couplings formed in the vacuum manifold, wherein each of the leaktight couplings comprises an inner surface that forms at least a portion of the one or more suction orifice[s] and an outer surface in contact with a connector on the suction device, wherein the leaktight couplings prevent fluids and microbes in the array of suction devices from reaching the outer surface of the leaktight couplings.

11. The vacuum tool device of claim 8, wherein the array of suction devices comprises a first group of suction devices connected to the first manifold conduit, and a second group of suction devices connected to the second manifold conduit, and wherein the first and the second group of suction devices each comprise greater than or about ten suction devices.

12. The vacuum tool device of claim 8, wherein the first manifold conduit and the second manifold conduit each comprises a removable end cap that exposes an inner wall of the first manifold conduit or second manifold conduit when opened.

13. A vacuum-assisted product-handling method comprising:

moving one or more unpackaged products on a carrier into a contact position;

attaching an unpackaged product of the one or more unpackaged products in the contact position to one or more arrays of suction devices on a vacuum tool that is connected to a mechanical arm of an actuation unit;

wherein the vacuum tool comprises the one or more arrays of suction devices, the one or more arrays of suction devices comprises one or more suction devices, and a vacuum manifold comprising one or more suction orifices, wherein each suction device of the one or more suction devices is connected to a suction orifice of the one or more suction orifices through a connector of the respective suction device, wherein the connector of the suction device and the suction orifice define a suction conduit having a length and a diameter, wherein a ratio of the length of the suction conduit to the diameter of the suction conduit is greater than or about 2:1, wherein the one or more arrays of suction devices are connected to a single vacuum source;

wherein a fraction of the suction devices remain unattached to the unpackaged product, and wherein at least one of the suction devices attached to the unpackaged product extends a different length between the vacuum tool and the unpackaged product than at least one other of the suction devices attached to the unpackaged product;

lifting the unpackaged product off the carrier with the actuation unit;

detaching the unpackaged product from each suction device of the one or more suction devices into a receiving container; and moving a cleaning liquid from the vacuum manifold out of the vacuum tool through the one or more suction devices of the vacuum tool.

14. The method of claim 13, wherein each suction device of the one or more suction devices attached to the unpackaged product have an equal pressure difference between an interior of the suction device and an exterior of the suction device.

15. The method of claim 14, wherein greater than or about five suction devices are attached to each unpackaged product of the one or more unpackaged products when the one or more unpackaged products are lifted off the carrier.

16. The method of claim 15, wherein the method further comprises detaching a sheet of packing material from the vacuum tool onto the one or more unpackaged products in the receiving container before detaching an additional unpackaged product of the one or more unpackaged products in the receiving container.

17. The method of claim 13, wherein the unpackaged products each comprise a slab of cheese having a weight greater than or about 5 lbs.

* * * * *